Sept. 15, 1936.                 B. DICK                    2,054,652
                    FITTING FOR FLUID PRESSURE SYSTEMS
                       Filed March 16, 1935          2 Sheets-Sheet 1
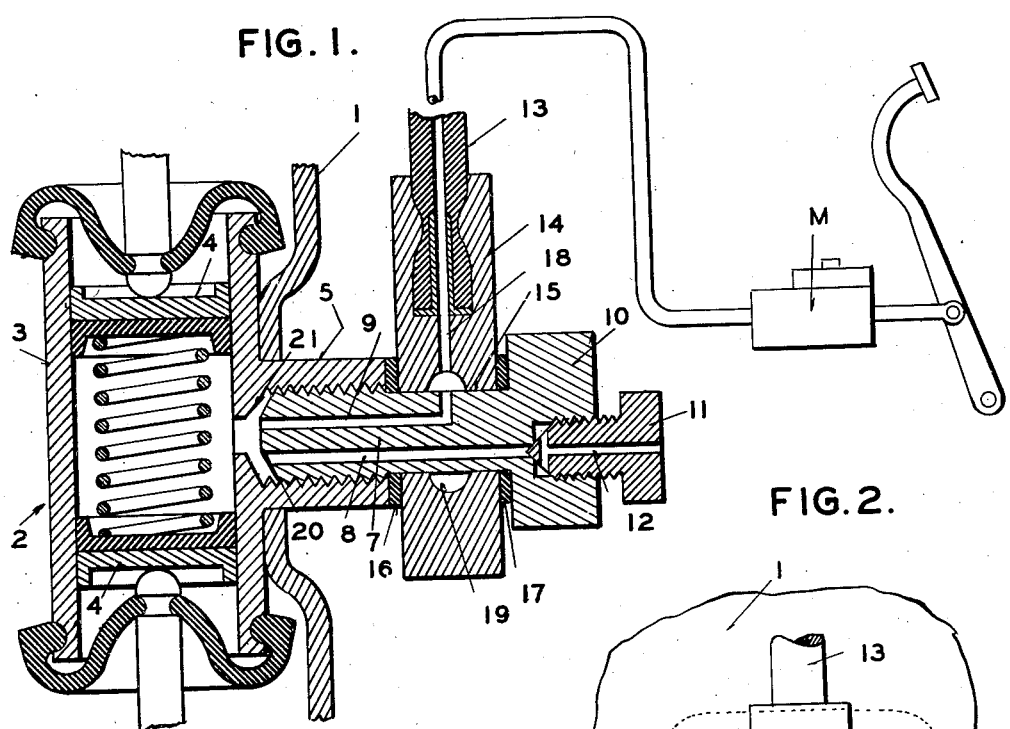
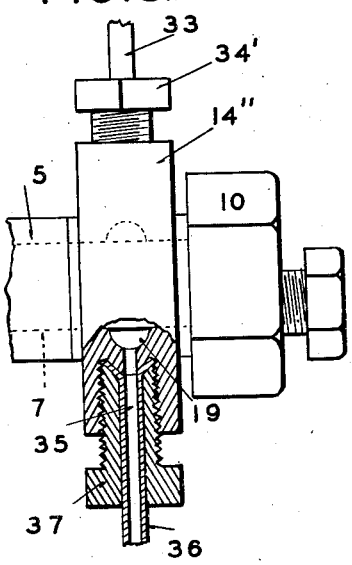
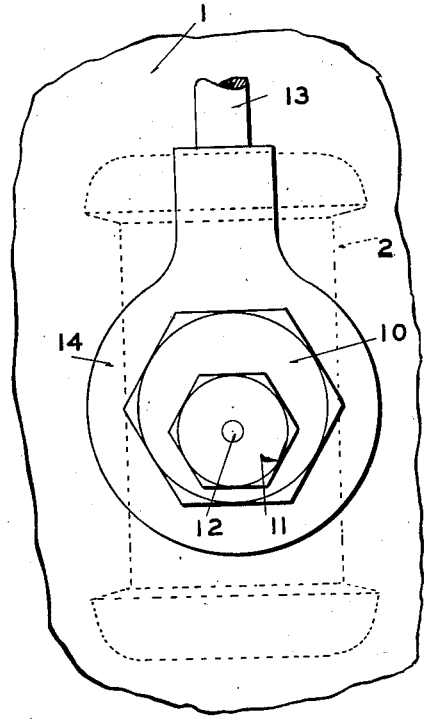
INVENTOR
BURNS DICK

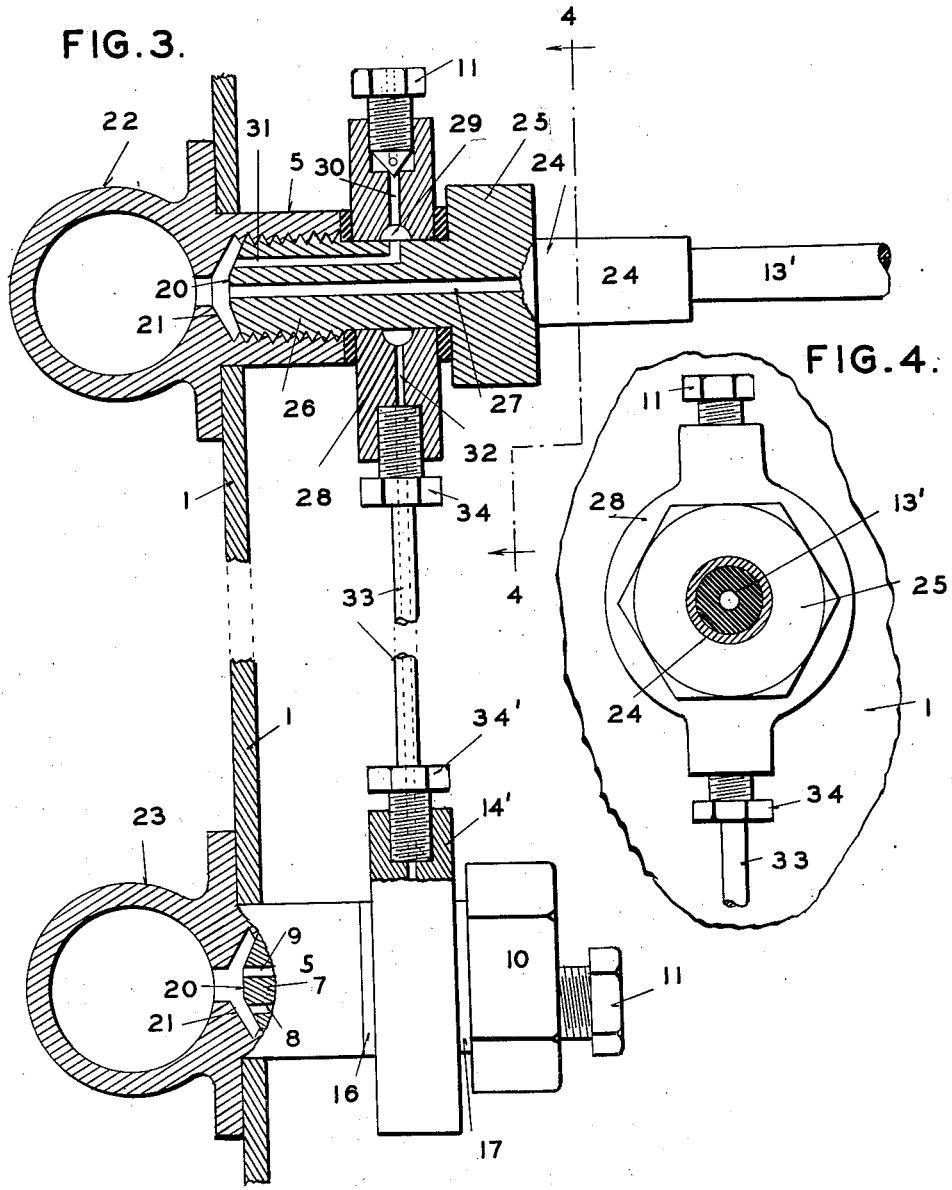

Patented Sept. 15, 1936

2,054,652

UNITED STATES PATENT OFFICE 2,054,652

FITTING FOR FLUID PRESSURE SYSTEMS

Burns Dick, Ferguson, Mo., assignor to Wagner Electric Corporation, St. Louis, Mo., a corporation of Delaware Application March 16, 1935, Serial No. 11,524

15 Claims. (Cl. 60—54.6)

My invention relates to fluid pressure systems and more particularly to an improvement in the means for connecting the fluid supply conduit or conduits of a hydraulic brake system to the fluid receiving chamber whereby the bleeding of air from the system may be accomplished.

One of the objects of my invention is to produce a connecting means between a supply conduit and a fluid chamber which embodies means for economically and efficiently bleeding the conduit and chamber.

Another object of my invention is to produce bleeding means for a fluid pressure chamber which is combined with and carried by the connecting structure between the supply conduit and the chamber.

A further and more specific object of my invention is to construct a fitting member which embodies independent fluid supply and bleeder passages, and which is adapted to be screwed into a threaded chamber opening to clamp a second fitting member to the wall of the chamber.

Other objects of my invention will become apparent from the following description taken in connection with the accompanying drawings in which Figure 1 is a cross-sectional view of my improved fitting employed in connecting a flexible hose to the fluid receiving chamber of a hydraulic brake system; Figure 2 is a side view of Figure 1; Figure 3 is a cross-sectional view of a portion of a hydraulically-actuated brake provided with two fluid receiving chambers connected in series to a fluid supply conduit by means of fitting structures embodying my invention. Figure 4 is a cross-sectional view taken on the line 4—4 of Figure 3; and Figure 5 is a cross-sectional view of a modification of one of the fitting structures shown in Figure 3.

Referring in detail to Figures 1 and 2, the numeral 1 indicates a backing plate for a vehicle brake assembly to which is secured the usual brake actuating motor 2, comprising a cylinder 3 and a pair of oppositely actuating pistons 4. The wall of the cylinder is provided with a boss 5 extending through an opening in the backing plate, the boss having a threaded passage 6. A bolt 7 is threaded into the boss 5 and is provided with a pair of passages 8 and 9, passage 8 extending through the head 10 of the bolt 7 to the atmosphere. A bleeder plug 11 carried by the head of the bolt controls the passage 8. The bleeder plug is of well known construction and when it is unscrewed to move its cone shaped end away from the end of passage 8, fluid can flow out of the cylinder through the passage 8 by way of a passage 12 in the bleeder plug.

The fluid supply conduit for supplying fluid-under pressure to the cylinder, is shown in this instance as a flexible hose 13, to which is permanently connected a terminal member 14. This terminal member has an opening 15 through which the body of the bolt 7 extends, whereby the terminal member may be clamped between the boss 5 on the cylinder and the head 10 of the bolt. Suitable packing washers 16 and 17 are provided on each side of the hose terminal in order to maintain a fluid-tight connection. The terminal member 14 has a passage 18 for placing the hose in communication with an annular chamber 19 in the terminal member, which annular chamber is in direct communication with the passage 9 in the bolt.

By means of the construction just described, fluid under pressure is supplied to the brake actuating motor through the flexible hose which is connected to a source of pressure as, for example, the usual master cylinder M of a hydraulic brake system. When it is desired to eliminate any air which may be in the fluid motor, the bleeder plug 11 is unscrewed, whereupon fluid can be forced to flow from the hose 13 through the passage 9 into the cylinder 3 and then out to the atmosphere by way of passage 8 and passage 12 in the bleeder plug. The construction described insures that during bleeding air in the chamber will be removed since the independent passages 8 and 9 cause the fluid to pass through the chamber.

In order to assist the bleeding action, the end of the bolt 7 is provided with a nose portion 20 and the chamber opening is provided with restricting means 21 spaced from the nose portion. By means of this construction, when fluid is pumped through the passage 9 during bleeding, a solid stream of fluid will pass through the opening and impinge against the opposite wall of the cylinder, flowing back along the cylinder walls to the edge of the cylinder opening and then out through the passage 8. It is thus seen that there is complete circulation of fluid in the cylinder together with a "turbulence" which insures that any air in the cylinder will be picked up and carried out through the bleeder passage.

By means of the structure just described, it is possible to position the hose terminal at any angle desired, since the hose terminal member is adapted to be rotated about the axis of the bolt prior to the bolt being screwed down to clamp the terminal member between the cylinder boss 5 and the bolt head. The annular chamber 19 in the terminal member insures that the passage 18 in the terminal member will always be in communication with the passage 9 in the bolt regardless of what angle the hose terminal member may assume.

The construction just described eliminates the necessity of a separate bleeder passage in the chamber wall as is the present practice thereby decreasing the manufacturing costs of the brake system. The bleeder plug is also positioned where it may be more easily reached when desired to bleed the system.

Referring in detail to Figures 3 and 4, I have disclosed my invention embodied in a single brake assembly wherein two separate fluid motors 22 and 23 are employed, these motors being secured to the backing plate 1 and provided with bosses 5 in the same manner as the previously described motor 2. The flexible hose 13' for supplying fluid under pressure to the fluid motor 22 has its terminal member 24 provided with an enlarged wrench receiving portion 25 and a threaded extension 26 in order that it may perform the functions of the bolt 7 in the previously described structure. The terminal member 24 has a passage 27 for connecting the hose 13' with the chamber of the fluid motor. The extension 26 is also provided with a nose portion 20 for cooperating with the restricting means 21 in the chamber opening as already described.

The extension 26 of the terminal member extends through an opening in a member 28 which is clamped between the boss 5 and the wrench receiving portion 25 of the terminal member. The member 28 is provided with an annular chamber 29 which is in communication with the atmosphere by means of the passage 30, this passage being controlled by a bleeder plug 11 having the same construction as the previously described bleeder plug. The chamber 29 is in communication with the fluid motor by means of the passage 31 in the extension 26 of the terminal member. The member 28 is also provided with a second passage 32 which is in communication with a tube 33, the tube being connected to the member 28 by means of the usual nut 34 cooperating with a threaded opening in the member 28.

The boss 5 of the fluid motor 23 is provided with a structure similar to that previously described with respect to Figure 1, differing only in that the member 14' is constructed to be connected to the tube 33 by a nut 34' instead of to a flexible hose.

In the construction shown in Figures 3 and 4, when it is desired to bleed the system to eliminate any air which may be therein, the bleeder plug 11 on the bolt 7 is unscrewed, thus permitting fluid to flow from the hose 13' through the passage 27, motor 22, passage 31, copper tube 33, passage 9, fluid motor 23 and the passage 6. If it is desired to bleed only the motor 22, the bleeder plug 11 in the member 28 is unscrewed, thus permitting fluid to flow from the hose 13' through the motor 22, passage 31, and the passage 30 without passage of fluid though the motor 23.

If desired, the structure shown in Figure 1 may be employed in place of the structure shown in connection with the fluid motor 22 of Figure 3. If such combination were employed, it would be possible to bleed the motor 23 by unscrewing the bleeder plug 11 in the bolt 7 without necessitating the flow of liquid through the fluid motor 22, since in this instance the tube 33 would be directly connected to the annular chamber 19 in the hose terminal member 14 of Figure 1.

In Figure 5 I have disclosed the fitting structure of the fluid motor 23 adapted for connecting another fluid motor in series with the motor 23, if such is found desired. This additional fluid motor may be on the same brake assembly, or it may be on a separate brake assembly of another wheel of the vehicle. To adapt the fitting for this use, it is only necessary that the member 14" be provided with a passage 35, whereby the annular passage 19 will be connected to a tube 36 leading to the other motor, which tube is secured to the member 14" by the usual nut 37.

From the foregoing description it will be readily seen that my invention may be embodied in various structures employed in connecting fluid conduits with fluid chambers. In all of the embodiments shown, the supply passage and the bleeder passage enter the fluid chamber through a single removable element thereby requiring only one opening in the fluid chamber wall to supply fluid to the chamber and to bleed the chamber to eliminate air.

Having fully described my invention, what I claim as new and desire to secure by Letters Patent of the United States is:

1. In fluid pressure mechanism, a fluid receiving chamber provided with an opening in its wall, a member having a portion extending into the opening and secured to the chamber wall, said member and portion being provided with a pair of independent passages communicating with the chamber, a second member surrounding the first named member and clamped to the chamber by said first named member, a fluid supply conduit connected to one of said members and communicating with one of the passages, and a valve carried by the other member and controlling the other passage.

2. In fluid pressure mechanism, a fluid receiving chamber provided with a threaded opening in its wall, a member having a threaded portion extending into the threaded opening, said member and threaded portion being provided with a pair of independent passages communicating with the chamber, a second member surrounding the first named member and clamped to the chamber by said first named member, a fluid supply conduit connected to one of said members and communicating with one of the passages, and a valve carried by the other member and controlling the other passage.

3. In fluid pressure mechanism, a fluid receiving chamber provided with a threaded opening in its wall, a member having a threaded portion extending into the threaded opening in the chamber wall and provided with a passage communicating with the chamber, a second member surrounding the first named member and clamped to the chamber by said first named member, said second named member being provided with a passage, a fluid supply conduit connected to one of said members and in communication with the passage therein, and a valve carried by the other member for controlling the passage therein, the passage in the second named member being in communication with the chamber by means of an independent passage in the first named member.

4. In fluid pressure mechanism, a fluid receiving chamber provided with a threaded opening in its wall, a member having a threaded portion extending into the threaded opening, said member and threaded portion being provided with a pair of independent passages communicating with the chamber, a second member surrounding the first named member and clamped to the chamber, said second named member being provided with a passage communicating with one of the passages in the first named member, a fluid supply conduit secured to the second member and communicating with the passage therein, and a valve carried by the first named member and controlling the other passage therein.

5. In fluid pressure mechanism, a fluid receiving chamber provided with a threaded opening in its wall, a member having a threaded portion extending into the threaded opening, said member and threaded portion being provided with a pair of independent passages communicating with the chamber, a second member surrounding the first named member and clamped to the chamber, said second member being provided with a passage communicating with one of the passages in the first named member, a valve carried by the second member for controlling the passage therein, and a fluid supply conduit secured to the first named member and communicating with the other passage therein.

6. In fluid pressure mechanism, a fluid receiving chamber provided with a threaded opening in its wall, a member provided with an opening, a bolt extending through the opening in the member and screwed into the threaded chamber opening for clamping the member to the chamber, said bolt being provided with a pair of independent passages in communication with the chamber, a valve carried by the bolt and controlling one of the bolt passages, and a conduit secured to the member and communicating with the other bolt passage.

7. In fluid pressure mechanism, a fluid receiving chamber provided with a threaded opening in its wall, a member provided with an opening, a bolt extending through the opening in the member and screwed into the threaded chamber opening for clamping the member to the chamber, said bolt being provided with a pair of independent passages in communication with the chamber, a valve carried by the bolt and controlling one of the bolt passages, said member being provided with a passage and an annular chamber communicating with the other passage in the bolt, and a conduit secured to the member and communicating with the passage therein.

8. In fluid pressure mechanism, a fluid receiving chamber provided with a threaded opening in its wall, a flexible hose, a hose terminal member permanently secured to the hose end and having an opening therein, a bolt extending through the opening in the terminal member and clamping said member to the chamber, said bolt being provided with a pair of independent passages therethrough and communicating with the chamber, and a valve for controlling one of said passages, said terminal member being provided with a passage for connecting the hose with the other passage in the bolt.

9. In fluid pressure mechanism, a fluid receiving chamber provided with a threaded opening in its wall, a member provided with an opening, a bolt extending through the opening in the member and screwed into the threaded chamber opening for clamping the member to the chamber, said bolt being provided with a pair of independent passages in communication with the chamber, a valve carried by the bolt and controlling one of the bolt passages, a supply conduit secured to the member and communicating with the other bolt passage, and an outlet conduit secured to the member and also communicating with said last named bolt passage.

10. In fluid pressure mechanism, a fluid receiving chamber provided with a threaded opening in its wall, a flexible hose, a terminal member permanently secured to the hose and having a threaded portion extending into the threaded opening of the chamber, said terminal member being provided with a pair of independent passages, one of which places the hose in communication with the chamber, a member clamped to the chamber by the hose terminal member, said member being provided with a passage communicating with the chamber through the other passage in the terminal member, and a valve for controlling the passage in the member.

11. In fluid pressure mechanism, a fluid receiving chamber provided with a threaded opening in its wall, a flexible hose, a terminal member permanently secured to the hose and having a threaded portion extending into the threaded opening of the chamber, said terminal member being provided with a pair of independent passages, one of which places the hose in communication with the chamber, a member clamped to the chamber by the hose terminal member, said member being provided with a passage communicating with the chamber through the other passage in the terminal member, and an outlet conduit connected to the member and in communication with the passage therein.

12. In fluid pressure mechanism, a pair of fluid receiving chambers each provided with a threaded opening in its chamber wall, a threaded member extending into each chamber opening and provided with a pair of independent passages communicating with the chamber, a supply conduit communicating with a passage in one of the members, a valve for controlling a passage in the other member, and means comprising a conduit for placing the other passages in the members in communication with each other whereby the chambers will be interconnected, said last named conduit being independent of the supply conduit.

13. In fluid pressure mechanism, a pair of fluid receiving chambers each provided with an opening, a member secured to each chamber adjacent the opening and provided with a pair of passages communicating with the chamber, a supply conduit communicating with the passage in one of the members, a valve for controlling a passage in the other member, and means comprising a conduit for placing the other passages in the members in communication with each other whereby the chambers will be interconnected, said last named conduit being independent of the supply conduit.

14. In fluid pressure mechanism, a fluid receiving chamber provided with an opening in its wall, a member secured to the wall of the chamber and provided with a pair of independent passages, said member being spaced from the chamber opening to form a second chamber with which the passages communicate, means for supplying fluid under pressure to one of said passages, and means comprising a valve for controlling the other passage, the open end of the fluid supply passage being opposite the chamber opening.

15. In fluid pressure mechanism, a fluid receiving chamber provided with a threaded opening and a restricted passage between said opening and the chamber, a threaded member extending into the threaded opening to a point adjacent the restricted passage, said member being provided with a pair of passages communicating with the chamber, means for supplying fluid under pressure to one of said passages, and means comprising a valve for controlling the other passage, said fluid supply passage being in alignment with the restricted passage.

BURNS DICK.